US012643607B2

(12) United States Patent
Wu et al.

(10) Patent No.: US 12,643,607 B2
(45) Date of Patent: Jun. 2, 2026

(54) SLIDING FRAME FOR TRAILERS

(71) Applicant: GUANGDONG FUWA HEAVY INDUSTRIES CO., LTD., Jiangmen (CN)

(72) Inventors: Zhiqiang Wu, Taishan City (CN); Heng Zhang, Taishan City (CN)

(73) Assignee: GUANGDONG FUWA HEAVY INDUSTRIES CO., LTD., Jiangmen (CN)

( * ) Notice: Subject to any disclaimer, the term of this patent is extended or adjusted under 35 U.S.C. 154(b) by 245 days.

(21) Appl. No.: 18/488,610

(22) Filed: Oct. 17, 2023

(65) Prior Publication Data

US 2025/0002087 A1 Jan. 2, 2025

(30) Foreign Application Priority Data

Jul. 1, 2023 (CN) .......................... 202310795934.8

(51) Int. Cl.
| | |
|---|---|
| *B62D 21/14* | (2006.01) |
| *B62D 21/20* | (2006.01) |
| *B62D 53/06* | (2006.01) |

(52) U.S. Cl.
CPC ............. *B62D 21/14* (2013.01); *B62D 21/20* (2013.01); *B62D 53/067* (2013.01)

(58) Field of Classification Search
CPC ...... B60G 11/27; B60G 2300/40; B60G 9/04; B60G 99/002; B62D 21/152; B62D 25/08; B62D 21/11; B62D 21/20; B62D 25/2036; B62D 21/14; B62D 53/067
USPC ........................................................ 280/656
See application file for complete search history.

(56) References Cited

U.S. PATENT DOCUMENTS

| | | | | |
|---|---|---|---|---|
| 5,088,763 A | * | 2/1992 | Galazin ................ | B60G 99/002 |
| | | | | 280/789 |
| 5,335,932 A | * | 8/1994 | Pierce .................. | B62D 53/068 |
| | | | | 280/124.157 |
| 5,378,006 A | * | 1/1995 | Stuart .................... | B62D 21/14 |
| | | | | 280/149.2 |
| 5,480,171 A | * | 1/1996 | Cheffey ............... | B62D 53/068 |
| | | | | 180/906 |

(Continued)

FOREIGN PATENT DOCUMENTS

| | | |
|---|---|---|
| CN | 206155564 U | 5/2017 |
| CN | 214524059 U | 10/2021 |
| WO | 2008/042567 A2 | 4/2008 |

*Primary Examiner* — James A Shriver, II
*Assistant Examiner* — Hilary L Johns
(74) *Attorney, Agent, or Firm* — MUNCY, GEISSLER, OLDS & LOWE, P.C.

(57) ABSTRACT

Provided is a sliding frame for trailers, which includes a side beam, wherein the side beam includes a horizontally extending top wall and a vertically extending side wall, an upper surface of the top wall is provided with a wear-resistant pad extending along the length direction of the side beam; a guide rail clip is fixed on an outer surface of the side wall, wherein the guide rail clip includes a connection part fixed to the side wall, and a limiting part located above the connection part, and a backing plate is sandwiched between the connection part and the side wall, a part of the backing plate extends upward to an inner side of the limiting part, and a gap with openings at the top and both front and rear ends is formed between the limiting part and the backing plate.

13 Claims, 4 Drawing Sheets

(56) References Cited

U.S. PATENT DOCUMENTS

| | | | | |
|---|---|---|---|---|
| 5,564,725 A * | 10/1996 | Brazeal | ................ | B62D 53/068 |
| | | | | 180/209 |
| 6,213,489 B1 * | 4/2001 | Eckelberry | .......... | B62D 53/068 |
| | | | | 180/209 |
| 7,404,466 B2 * | 7/2008 | Diehl | ................... | B62D 53/068 |
| | | | | 180/209 |
| 8,272,654 B2 * | 9/2012 | Xie | ...................... | B62D 53/067 |
| | | | | 180/209 |
| 9,555,844 B2 * | 1/2017 | Hicks | ................ | B62D 53/0828 |
| 9,821,851 B1 * | 11/2017 | Kim | ..................... | B62D 29/007 |
| 10,449,817 B2 * | 10/2019 | Andreasen | .......... | B62D 53/068 |
| 2016/0096408 A1 * | 4/2016 | Hicks | ................... | B62D 53/068 |
| | | | | 280/124.109 |
| 2024/0227939 A1 * | 7/2024 | Dai | ........................ | B62D 21/11 |

* cited by examiner

SLIDING FRAME FOR TRAILERS

CROSS-REFERENCE TO RELATED APPLICATIONS

This application claims the priority of Chinese Patent Application No. 202310795934.8, filed on Jul. 1, 2023, the entire contents of which are hereby incorporated by reference.

FIELD OF TECHNOLOGY

The present application relates to the field of vehicle technology, and in particular to a sliding frame for trailers.

BACKGROUND

In traditional trailers, a suspension system is directly mounted on the trailer frame. The suspension system cannot be adjusted in the longitudinal direction of the trailer frame. Therefore, when the trailer is fully loaded or unloaded, the load cannot be distributed reasonably. In order to ensure that the load of the trailer can be distributed reasonably when the trailer is fully loaded and unloaded, a sliding frame is usually installed on the trailer frame, and the suspension system is installed on the sliding frame. The sliding frame can be adjusted longitudinally along the trailer frame, then the suspension system can be adjusted longitudinally just by adjusting the sliding frame longitudinally along the trailer frame, according to the specific loading conditions of the trailer. However, when the traditional sliding frame is adjusted, it slides relative to the trailer frame. The friction between the sliding frame and the trailer frame causes wear and tear of the sliding frame and the trailer frame. In addition, during the driving of the trailer, vibration causes frequent relative movements between the sliding frame and the trailer frame. The frequent relative movements cause excessive wear between the sliding frame and the trailer frame, which in turn seriously affects the service life of the trailer.

SUMMARY

An aspect of the present application provides a sliding frame for trailers with a longer service life.

An aspect of the present application provides a sliding frame for trailers, which includes a side beam, the side beam includes a horizontally extending top wall and a vertically extending side wall, an upper surface of the top wall is provided with a wear-resistant pad extending along a length direction of the side beam; a guide rail clip is fixed on an outer surface of the side wall, the guide rail clip includes a connection part fixed to the side wall, and a limiting part located above the connection part, the connection part is plate-shaped, and a backing plate is sandwiched between the connection part and the side wall, a part of the backing plate extends upward to an inner side of the limiting part, and a gap with openings at the top and both front and rear ends is formed between the limiting part and the backing plate; the connecting part and the backing plate are removably connected to the side wall.

BRIEF DESCRIPTION

DETAILED DESCRIPTION

The present application will be further described below with reference to the accompanying drawings and specific embodiments. In this embodiment, an extension direction of a guide rail parallel to a horizontal plane is a longitudinal direction, a vertical direction perpendicular to a horizontal plane is a height direction, and a direction parallel to the horizontal plane and perpendicular to the longitudinal direction is the height direction. A sliding frame may move longitudinally along the guide rail.

Figure 1:
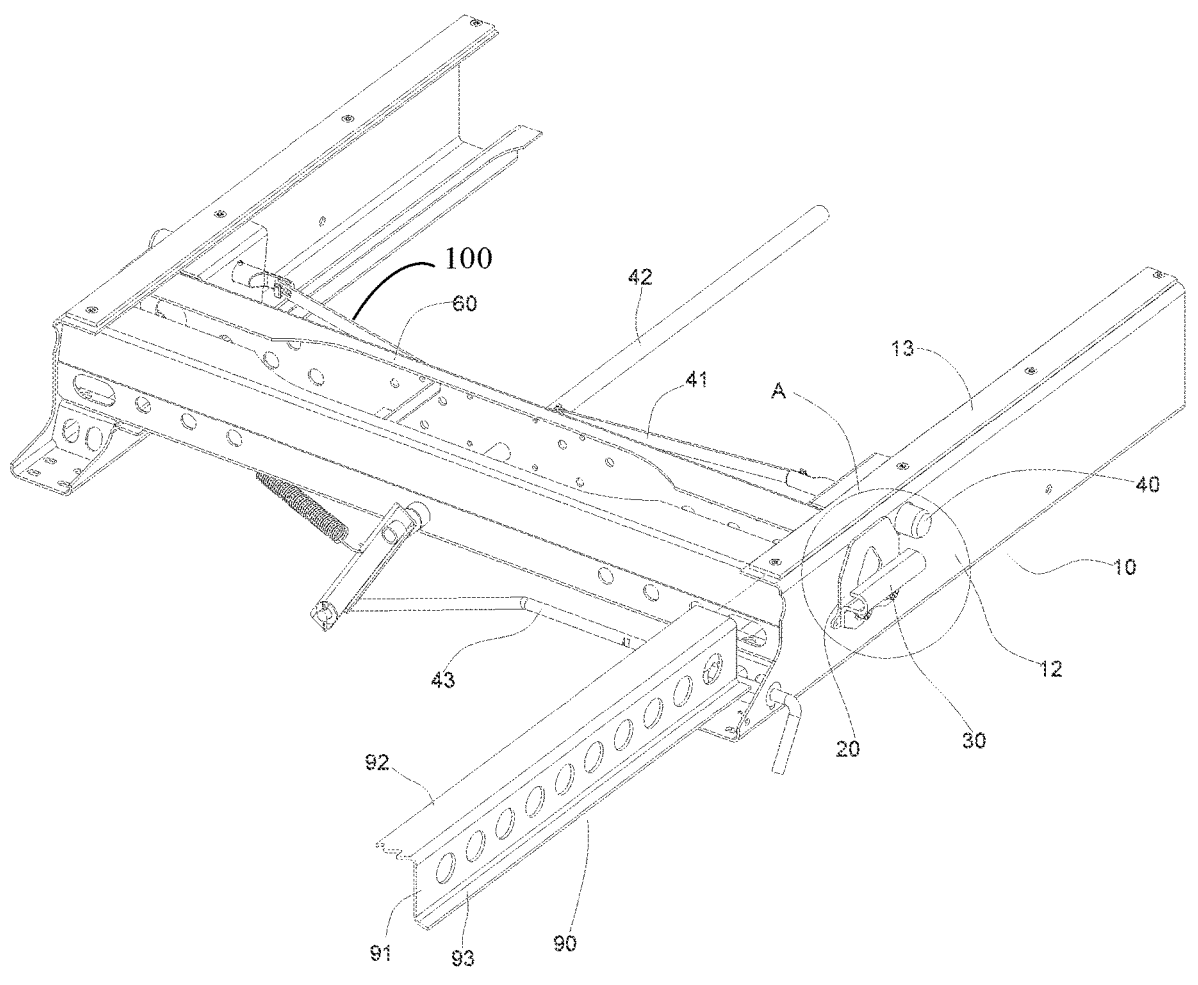
FIG. 1 is a schematic structural view of a sliding frame and a guide rail according to an embodiment of the present application.
Figure 2:
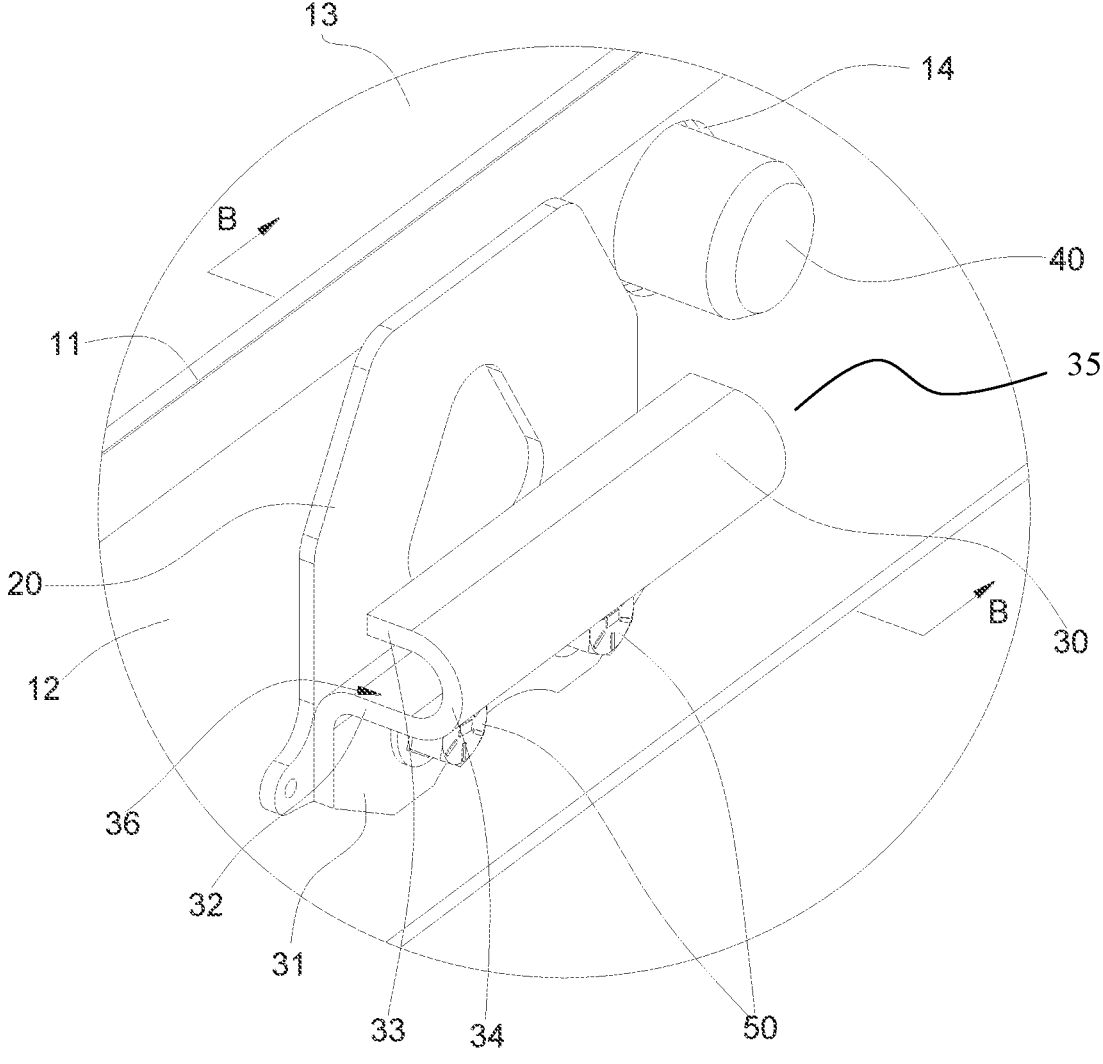
FIG. 2 is a partial enlarged view of position A in FIG. 1.
Figure 3:
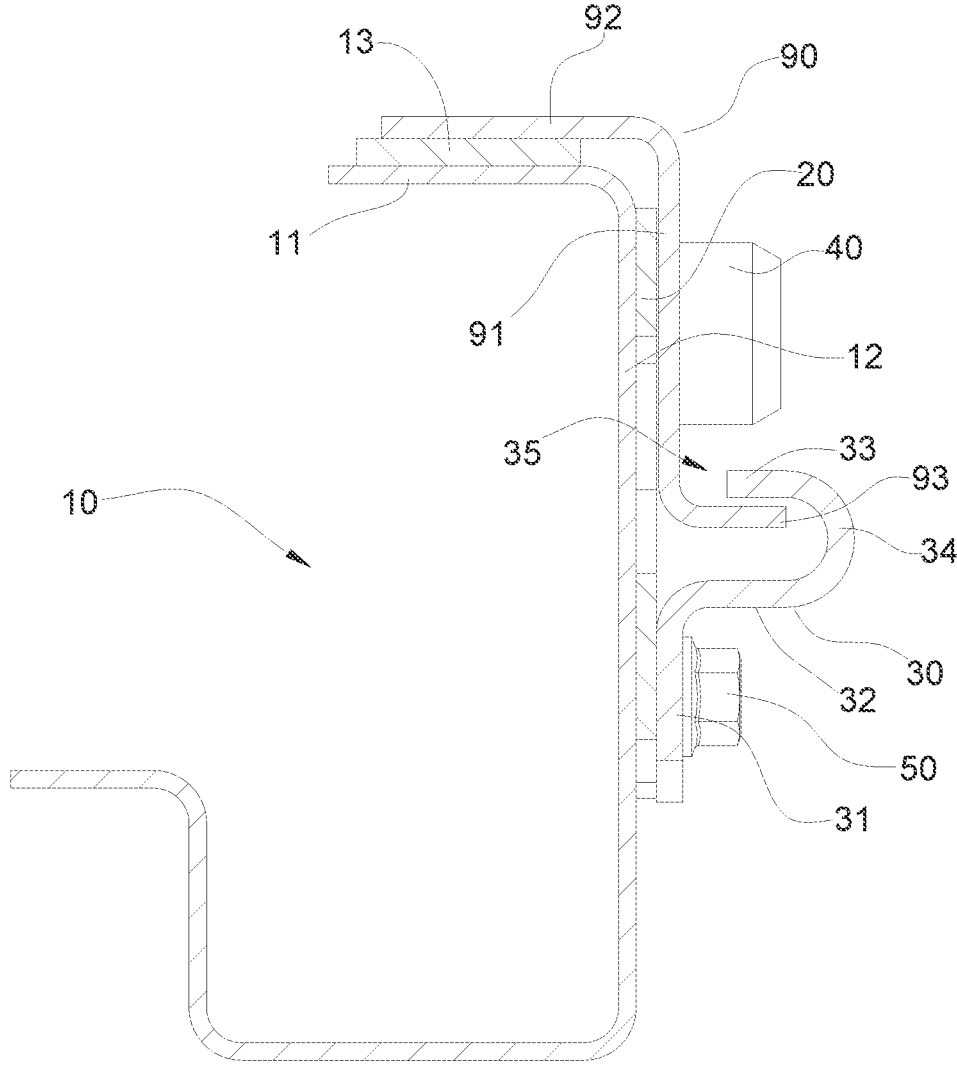
FIG. 3 is a B-B cross-sectional view of FIG. 2.

As shown in FIGS. 1, 2 and 3, it is a sliding frame for trailers of the present application, which includes a side beam 10. The side beam 10 may be formed by bending a plate, and include a horizontally extending top wall 11 and a vertical extending side wall 12. The side wall 12 may be formed by bending toward each other along outer edges of the top wall 11. In this embodiment, after bending, an angle between the side wall 12 and the top wall 11 is approximately at a right angle. One side where the top wall 11 is located is an inner side of the side wall 12, and the other side is an outer side of the side wall 12. An upper surface of the top wall 11 is provided with a wear-resistant pad 13. The wear-resistant pad 13 extends along a length direction of the side beam 10. The wear-resistant pad 13 may be an integral structure placed on the upper surface of the top wall 11. Of course, the wear-resistant pad 13 may also be a multi-section structure, which is arranged in a discontinuous structure on the upper surface of the top wall 11 along the length direction of the side beam 10. A guide rail clip 30 and a backing plate 20 corresponding thereof are fixed on an outer surface of the side wall 12. The guide rail clip 30 includes a connecting part 31 and a limiting part 35, and the connecting part 31 has a plate-like structure. A surface of the backing plate 20 abuts against the outer surface of the side wall 12, a surface of the connecting part 31 abuts against an outer surface of the backing plate 20, and the backing plate 20 and the connecting part 31 are all fixed on the side wall 12. The limiting part 35 is located above the connecting part 31, a part of the backing plate 20 extends upward, so that at least a part of the backing plate 20 is located inside the limiting part 35, forming a gap between the limiting part 35 and the backing plate 20. A top opening 35 is formed between a top of the gap and the backing plate 20, end openings 36 are respectively formed at the front and rear ends in a length direction of the side beam 10, and the end openings 36 are communicated with the top opening 35, which makes the gap to be formed into a structure with the top and front and rear ends all open. The connecting part 31 and the backing plate 20 are removably connected to the side wall 12. In this embodiment, a top edge of the backing plate 20 extends to and is flush with a top of the side wall 12.

After the sliding frame is assembled with the trailer frame, the guide rails 90 on the trailer frame cooperate with the side beams 10. Specifically, a top plate 92 of the guide rail 90 is placed above the top wall 11, the side plate 91 of the guide rail is placed outside the side wall 12, and the side plate 91 is inserted into the gap from the end opening 36 on one side and passes through the gap. The top plate 92 is in contact with an upper surface of the wear-resistant pad 13 after being placed above the top wall 11, and the side plate 91 is in contact with the outer surface of the backing plate 20 after being embedded in the gap. That is, in the height direction, the wear-resistant pad 13 is used to provide support for the guide rail 90, and in the width direction of the trailer frame, the backing plate 20 is used to provide support for the guide rail 90, to prevent the guide rail 90 from directly contacting the side beam 10. The guide rail 90 frictionally fits with the wear-resistant pad 13 and the backing plate 20 to prevent excessive wear between the guide rail 90 and side beam 10 of the trailer frame, when adjusting the position of the sliding frame longitudinally along the trailer frame extending along the length direction of the side beam 10. At the same time, when the trailer is running, due to the relative movement between the trailer frame and the sliding frame caused by vibration, the above-mentioned backing plate 20 may also prevent the side beam 10 from being in direct contact with the guide rail 90, and then it further protects the side beam 10 and the guide rail 90, and ultimately, it is beneficial to extend the service life of the trailer frame and the sliding frame. In addition, the backing plate 20 is removable fixed on the side wall 12. The backing plate 20 may be detached from the side beam 10 to replace with a new backing plate 20, when the wear thickness of the backing plate 20 reaches a certain level.

In the present application, the backing plate 20 is a plate made of plastic material. In an embodiment, the plastic material is UHMW (ultra-high molecular polyethylene). Of course, the backing plate 20 may also be made of a composite material with high wear resistance, such as, chromium carbide composite materials, etc.

The limiting part 35 includes a first section 32, a second section 33 and a third section 34. The first section 32 is formed by bending a top of the connecting part 31 at approximately 90 degrees in a direction away from the side wall 12, and extends in the direction away from the side wall 12. In this embodiment, an extension direction of the first section 32 is substantially perpendicular to the side wall 12. The second section 33 is located above the first section 32 and is arranged at a certain distance from the first section 32. In this embodiment, the extension direction of the first section 32 and the second section 33 is basically parallel to each other. The third section 34 is connected between the first section 32 and the second section 33, and the top opening 35 is located between the second section 33 and the backing plate 20, so that the gap forms an outwardly extending portion below the second section 33. A bottom of the side plate 91 of the guide rail 90 is provided with a bottom plate 93 that is bent outward at approximately 90 degrees. The bottom plate 93 is received in the outwardly extending portion of the gap. In this way, a top of the bottom plate 93 is limited by the second section 33. The bottom plate 93 and the second section 33 cooperate to form a limiting mechanism, which is used to limit the relative position of the guide rail 90 and the side beam 10 in the height direction, thereby preventing the guide rail 90 from being separated from the side beam 10 in the height direction.

The connecting part 31, the backing plate 20, and the side wall 12 are connected together through bolts 50 that cross the three of them, so that the connecting part 31, the backing plate 20 and the side wall 12 may be detachably connected. When the backing plate 20 needs to be replaced, the bolts 50 may be loosened, the guide rail clip 30 and the backing plate 20 are sequentially removed from the side wall 12, and then the backing plate 20 is replaced with a new one. In other embodiments, the connecting part 31, the backing plate 20, and the side wall 12 may also be fixed together by rivets crossing the three of them. When the backing plate 20 needs to be replaced, the rivets may be removed, and new rivets are used to rivet and fix the connecting part 31, the new backing plate 20 and the side wall 12 together. Of course, the connecting part 31 and the backing plate 20 may also be fixed on the side wall 12 using other detachable connection methods.

The sliding frame of the present application also includes a lock pin 40. Corresponding to the position of the lock pin 40, a through hole 14 is provided on the side wall 12. The lock pin 40 is inserted into the through hole 14, and a driving mechanism 100 is provided in an inner side the lock pin 40. The driving mechanism 100 is used to drive the lock pin 40 to reciprocate along the width direction of the sliding frame, so that the lock pin 40 may be moved between a first position protruding from the outer surface of the side wall 12 and a second position located in an inner side of the side wall 12. In this embodiment, the driving mechanism 100 is a pull rod 43 connected to the lock pin 40. The pull rod 43 extends along the width direction and may pull the lock pin 40 away from the side beam 10 along the width direction. When the lock pin 40 is in the first position, the lock pin 40 passes through the through hole 14 and then penetrates into a lock pin hole preset in the guide rail 90. In this way, the guide rail 90 and the side beam 10 are locked by the lock pin 40. At this time, the trailer is in a state that may be driven by tractors. When a position of the sliding frame needs to be adjusted, the driving mechanism drives the lock pin 40 to move to the second position. At this time, the lock pin 40 no longer limits a relative position between the guide rail 90 and the side beam 10, and then the position of the sliding frame may be adjusted. When the sliding frame is adjusted to an appropriate position, the driving mechanism drives the lock pin 40 to move to the first position, so that the lock pin 40 is passed through the through hole 14 and then inserted into the lock pin hole at the corresponding position on the guide rail 90. The driving mechanism includes a transmission rod 42 pivotally connected to a cross beam 60, a connecting rod 41 connected between the transmission rod 42 and the lock pin 40, and the pull rod 43. Two ends of the connecting rod 41 are respectively hinged to an inner end of the lock pin 40 and the periphery of the transmission rod 42. The pull rod 43 is connected to an end of the transmission rod 42. Operating the pull rod 43 drives the transmission rod 42 to rotate, and then drives the connecting rod 41 to move, which will pull the lock pin 40 inward, and the lock pin 40 may be retracted inward to the second position. A spring connected between the cross beam 60 and the transmission rod 42 may reset the transmission rod 42. During the reset process, the transmission rod 42 drives the connecting rod 41 to push the lock pin 40 to move outward to the first position. Of course, a spring may also be provided between the side beam 10 and the lock pin 40. When the lock pin 40 moves inward, it moves relative to the side beam 10 to compress the spring. The rebound force of the spring pushes the lock pin outward, to move the lock pin outward from the second position to the first position.

Figure 4:
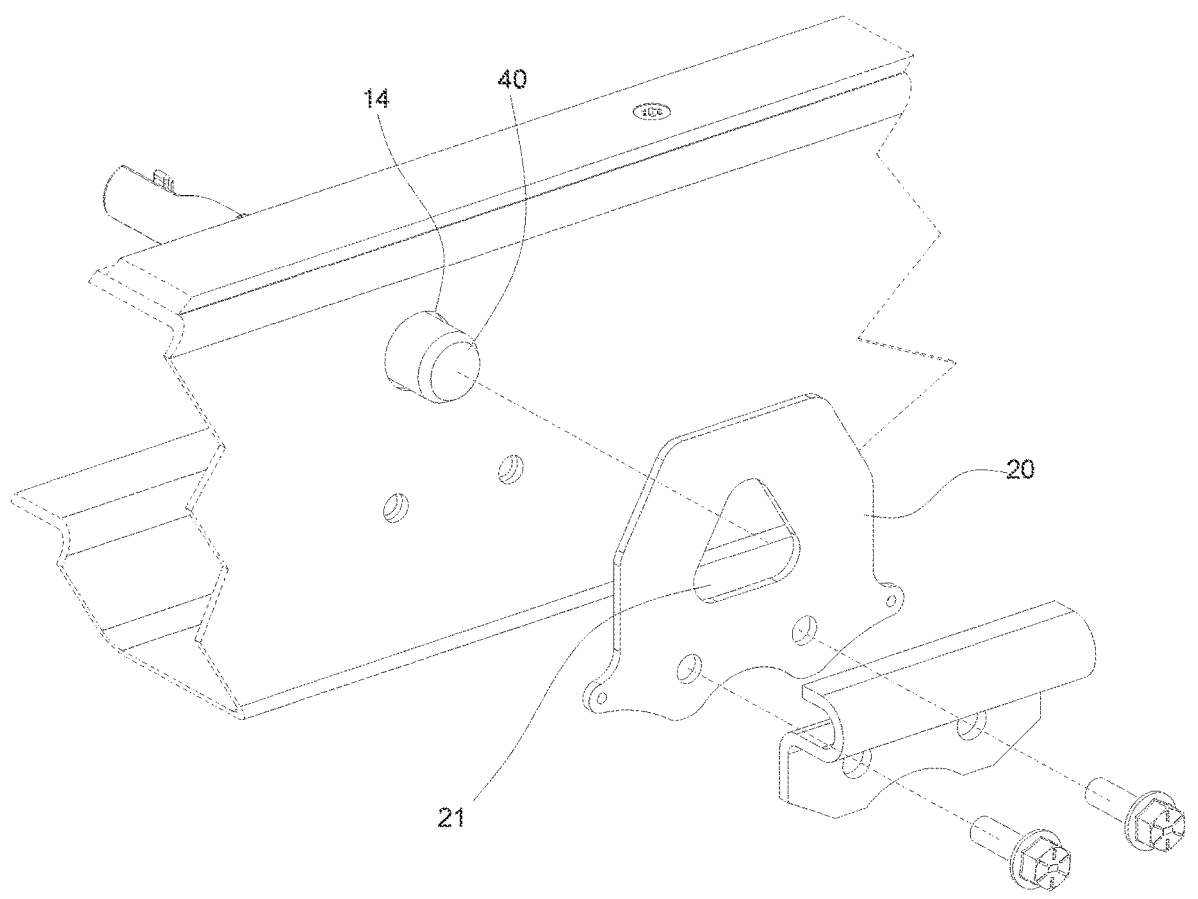
FIG. 4 is a schematic partial structural view of the sliding frame according to another embodiment of the present application.

The backing plate 20 may be disposed at the periphery of the through hole 14, that is, the backing plate 20 and the guide rail clip 30 are disposed as close to the lock pin 40 as possible. Referring to FIG. 4, in another embodiment, the backing plate 20 may also be arranged around the through hole 14, that is, the backing plate 20 is disposed at the periphery of the lock pin 40. An avoidance hole 21 is provided in the backing plate 20, and the lock pin 40 may pass through the avoidance hole 21. In this way, installation positions of the guide rail clip 30, the backing plate 20 and the lock pin 40 on the side beam 10 overlap. Since the guide rail clip 30 plays a limiting role on the guide rail 90, during the driving of the trailer, the guide rail 90 comes into contact with the side beam 10 most frequently at the guide rail clip 30. Therefore, in the structure shown in FIG. 4, the positions of the guide rail clip 30, the backing plate 20 and the lock pin 40 are set to be overlapped, and the backing plate 20 is provided at a position where the guide rail 90 and the side beam 10 are in frequent contact, thereby further reducing the wear between the guide rail 90 and the side beam 10.

The sliding frame for trailers of the present application includes two side beams 10 that are oppositely arranged in the width direction. The cross section of the side beam 10 may be set in a C-shape or a G-shape. A number of cross beams 60 are connected between the two side beams 10, and a main body of the sliding frame forms a frame structure through the two side beams 10 and the several cross beams 60.

The sliding frame of the present application uses the wear-resistant pad to provide support for the guide rails in the height direction, and uses the backing plate to provide support for the guide rails in the width direction of the trailer frame to avoid direct contact between the guide rails and the side beams, which is beneficial to the service life of the trailer frame and the sliding frame. In addition, the backing plate is removable fixed on the side wall. When the wear thickness of the backing plate reaches a certain level, the backing plate may be detached from the side beam to replace with a new backing plate.

The above embodiments are only used to illustrate the technical solution of the present application, but not to limit it; Although the present application has been described in detail with reference to the foregoing embodiments, those of ordinary skill in the art will understand that they can still modify the technical solutions recorded in the foregoing embodiments, or make equivalent substitutions for some of the technical features, and these modifications or substitutions do not deviate from the essence of the corresponding technical solutions from the spirit and scope of the technical solutions of each embodiment of the present application.

What is claimed:

1. A sliding frame for trailers, comprising a side beam, wherein the side beam includes a horizontally extending top wall and a vertically extending side wall, an upper surface of the top wall is provided with a wear-resistant pad extending along the length direction of the side beam; a guide rail clip is fixed on an outer surface of the side wall, the guide rail clip includes a connection part fixed to the side wall, and a limiting part located above the connection part, the connection part is plate-shaped, and a backing plate is sandwiched between the connection part and the side wall, a part of the backing plate extends upward to an inner side of the limiting part, and a gap with openings at the top and both front and rear ends is formed between the limiting part and the backing plate; the connecting part and the backing plate are removably connected to the side wall;

wherein a top edge of the backing plate extends to and is flush with a top of the side wall.

2. The sliding frame for trailers of claim 1, wherein, the backing plate is a plastic plate or composite material plate.

3. The sliding frame for trailers of claim 1, wherein, the limiting part includes a first section bent from a top of the connecting part in a direction away from the side wall, a second section located above the first section and spaced apart from the first section, and a third section connected between the first section and the second section.

4. The sliding frame for trailers of claim 1, wherein, the connecting part, the backing plate and the side wall are connected together by bolts or rivets crossing them.

5. The sliding frame for trailers of claim 1, wherein, the sliding frame for trailers further includes a lock pin, the side wall is provided with a through hole, the lock pin is inserted into the through hole, a driving mechanism is provided on an inner side of the lock pin, which is used to drive the lock pin to move between a first position protruding from an outer surface of the side wall and a second position located in an inner side of the side wall.

6. The sliding frame for trailers of claim 5, wherein, the backing plate is located at a periphery of the through hole.

7. The sliding frame for trailers of claim 5, wherein, the backing plate is arranged around the through hole, and the backing plate is provided with an avoidance hole for the lock pin to pass through.

8. The sliding frame for trailers of claim 1, wherein, the sliding frame assembly for trailers includes two opposite side beams and at least two cross beams connected between the two side beams.

9. A sliding frame for trailers, comprising a side beam, wherein the side beam includes a horizontally extending top wall and a vertically extending side wall, an upper surface of the top wall is provided with a wear-resistant pad extending along the length direction of the side beam; a guide rail clip is fixed on an outer surface of the side wall, the guide rail clip includes a connection part fixed to the side wall, and a limiting part located above the connection part, the connection part is plate-shaped, and a backing plate is sandwiched between the connection part and the side wall, a part of the backing plate extends upward to an inner side of the limiting part, and a gap with openings at the top and both front and rear ends is formed between the limiting part and the backing plate; the connecting part and the backing plate are removably connected to the side wall;

wherein the sliding frame for trailers further includes a lock pin, the side wall is provided with a through hole, the lock pin is inserted into the through hole, a driving mechanism is provided on an inner side of the lock pin, which is used to drive the lock pin to move between a first position protruding from an outer surface of the side wall and a second position located in an inner side of the side wall;

wherein the backing plate is arranged around the through hole, and the backing plate is provided with an avoidance hole for the lock pin to pass through.

10. The sliding frame for trailers of claim 9, wherein, the backing plate is a plastic plate or composite material plate.

11. The sliding frame for trailers of claim 9, wherein, the limiting part includes a first section bent from a top of the connecting part in a direction away from the side wall, a second section located above the first section and spaced apart from the first section, and a third section connected between the first section and the second section.

12. The sliding frame for trailers of claim 9, wherein, the connecting part, the backing plate and the side wall are connected together by bolts or rivets crossing them.

13. The sliding frame for trailers of claim 9, wherein, the sliding frame assembly for trailers includes two opposite side beams and at least two cross beams connected between the two side beams.

\* \* \* \* \*